Patented July 1, 1930

1,769,297

UNITED STATES PATENT OFFICE

JAMES M. LAMBIE AND DONALD W. ROSS, OF WASHINGTON, PENNSYLVANIA

REFRACTORY MIXTURE

No Drawing.   Application filed October 30, 1926.   Serial No. 145,366.

Our invention relates to refractories, and contemplates the use, in refractory bodies, of aluminous materials that will expand on being fired, to compensate for, or counteract the shrinkage of the other ingredients during firing.

One special application of our invention comprises the employment of aluminous materials in the clay and grog mixtures for the manufacture of refractory articles that are subject to shrinkage in firing or in use, such as crucibles, glass melting pots, various types of fire brick, and the like. The invention is further particularly applicable to the manufacture of tank blocks which form the refractory walls of glass tanks and the like.

In our copending application, Serial No. 690,042, filed February 1, 1924, (now Patent No. 1,712,005), we describe a number of aluminous materials of which cyanite is designated as one of the most important.

Cyanite functions to counteract or compensate for firing shrinkage at lower temperatures than some other aluminous materials, such as natural sillimanite, dumortierite, etc., that expand through crystal re-arrangement at higher temperatures. Again, there are still other substances, such as corundum, that interact with the surplus silica content of clay (above the mullite ratio) and expand at still higher temperatures. We may thus, by the use of suitable quantities of two or more of these types of ingredients counteract the firing shrinkage of bodies containing them, over a wide range of temperatures.

However, in cases where the various ingredients do not shrink excessively at the lower temperatures, but do shrink at the higher temperatures, the cyanite may be dispensed with and some of the higher expanding substances, such as those above named may be employed to the exclusion of cyanite.

The amount of expansion in a given body will be controlled by so proportioning the expanding material to the quantity of plastic clay, etc., that the usual shrinkage under firing and when in use will be offset by the expansion of the aluminous materials.

Refractory plastic clay shrinks on being fired, and, in mixtures wherein fire clay is employed as a grog, such shrinkage results in the formation of fine cracks throughout the refractory body which is formed from said mixture. This action results in a rather open porous body and permits molten glass to enter such cracks so that there is rapid deterioration. If a large percentage of grog is finely ground, the cracks are present to a lesser degree than in the case of coarser materials. If the materials of the aluminous species that expand upon being fired, and which may or may not contain silica, are finely divided and uniformly disseminated through the plastic clay, in proper percentages, there will be a substantially uniform expansion that will compensate for the burning shrinkages of the clay and thus prevent the formation of cracks and crevices. The result is a continuous or unbroken body, with no gaps in the plastic clay or between the plastic clay and the particles of grog.

Aluminous materials that behave in this manner may be divided into two groups and characterized as follows: (1) Substantially non-porous aluminous materials that contain silica and which have a specific gravity greater than that of mullite (approximately 3.0) will expand on being sufficiently heated, and (2) substantially non-porous aluminous materials that do not contain silica, will, if brought to reacting temperature in contact with materials containing more silica than that of the mullite ratio, react with such silica, with resulting expansion. In general, those aluminous materials of this type that obtain silica for recrystallization from without their bodies, usually exhibit this expansion effect at higher temperatures than do those that contain silica.

If the aluminous material is finely divided and is used in sufficient percentage, and if the mix is sufficiently heated, the glassy matrix of the first material is shot through by a rigid frame-work of closely interlocking sillimanite crystals, with the result that the product is then very resistant to deformation at high temperatures, either under tension or under compression.

Cyanite, in its natural condition, has a specific gravity of approximately 3.67, while certain other aluminous materials, such as corundum, dead burned diaspore (i. e. diaspore which has been burned until it will shrink no further), dead burned bauxite and dead burned artificial alumina all are of substantially 4.0 specific gravity. In many cases, the use of these higher specific gravity materials is advantageous in that they have a greater expansion per unit volume than do the materials of lesser specific gravity.

Our invention makes use of those properties of the aluminous materials which have a specific gravity greater than 3.0, as outlined above, in the production of refractories in which the prevention of shrinkage is a prime requisite. The refractory bodies with which our invention is concerned we term, for convenience, "large-tonnage" refractories, on account of the fact that most of them, such as tank blocks and shapes for use against glass, are of relatively large size and weight, or smaller sizes made in large tonnage.

Among the aluminous materials which will expand, as stated above, on being fired, are corundum, dumortierite, natural sillimanite, dead burned alumina or aluminum hydrate derived from naturally occurring hydrates such as, bauxite, diaspore, etc., or from artificially-prepared material.

The dead burning of many aluminous materials is facilitated by incorporating a small amount of flux, as for example, alkaline earth or alkali metal compounds, with the aluminous materials before calcining. At least part of the aluminous materials that contain silica may be calcined before being placed in bodies if desired to decrease their further expansion in use in bodies. Such materials are also included in this class.

Of the substances named, corundum is one of the most satisfactory, since it is composed of pure crystalline alumina, and when heated in the presence of silica in the proportions of three molecular parts of corundum to two molecular parts of silica will change to mullite.

All of these substances will function in somewhat the same manner as cyanite, as recited in our application above referred to, in that they will expand on being fired, to compensate for shrinkage of the plastic clay and will form interlocking crystals. Under some conditions, the aluminous materials as described above will overcome shrinkage at higher temperatures than cyanite, because whereas cyanite begins to expand at cone 10 or 11 and at higher temperatures its expansion is completed, further vitrification of the body takes place and with the result that there is a tendency for the body to thereafter shrink, corundum and similar materials, such as burned diaspore, will begin to expand at cone 18.

The aluminous materials such as corundum (crystalline alumina), dumortierite and dead burned diaspore, will ordinarily be mixed with other materials in approximately the following percentages:—

|  | Per cent |
|---|---|
| Aluminous material | 5 to 60 |
| Plastic clay | 18 to 25 |
| Grog | 40 to 62 | but it will be, of course, understood that these percentages will vary in accordance with conditions such as the amount of shrinkage to be expected in a given kind of clay, the temperature to which the finished product is to be subjected, etc.

Plastic clays all contain aluminum in their natural state, and the percentage of aluminum contained therein, plus that in the corundum or other added aluminous material, may produce in the mix, a total alumina content of 72%. If the alumina content is 72% or greater, when fired to equilibrium, the mass will be more heterogeneously and finely crystalline and hence more resistant to spalling under heating and cooling.

We employ such aluminous material in a wide range of proportions, depending upon the results desired. In cases where it is desired to merely decrease the shrinkage, as little at 5% of corundum or the like may be placed in the batch. At the other extreme, where it is desired that the characteristics of the expanding material shall predominate, we employ in the batch as much as 95% of the aluminous material, which may be either raw, burned, or both raw and burned. The remainder of the batch will be composed of plastic clay, burned clay or grog, and perhaps ground pot shell.

A desirable mix for certain refractory bodies is one made of grains of assorted sizes, the larger being coarser than one hundred (100) mesh and the other sizes being so proportioned as to form a dense body with the grains substantially in contact with one another, so that shrinkage is minimized during the drying and firing operations, and in which the above-described aluminous materials or any portions of one or more of these ingredients constitute a portion of the grains, said grains being held together by a bonding material. For this purpose we preferably employ silicate of soda or clay. However, other materials commonly used to bond refractories may be employed.

While the above-described aluminous materials perform their useful functions largely through partial or complete transformation to mullite, the refractory bodies frequently contain unchanged aluminous material in greater or less quantity, and this aluminous material may be transformed further into mullite during the use of the refractory bodies, or some of it may remain unchanged throughout the life of the refractory.

In the claims, the expression "clay" is intended to include clay as ordinarily employed in fire-clay mixtures, such as kaolins, ball clays, fireclays, bauxite, diaspore, etc. including raw plastic clay and burnt clay.

By the term "matrix" we mean that portion of the clay and the smaller grog fines which lies between the larger grog particles and fills the interstices therebetween.

It will be understood that our invention is not restricted to the percentage compositions herein mentioned, or to the use of the particular ingredients herein specified for use in a mixture with aluminous materials, and that our invention includes all such modifications as fall within the scope of the appended claims.

We claim as our invention:—

1. A batch mixture for forming refractory bodies, containing an aluminous material that will expand at relatively low firing temperatures and a second aluminous material that will cause expansion at high temperatures, the mixture also containing silica, the said materials being in quantities sufficient to counteract shrinkage of various ingredients during firing.

2. A batch mixture for forming refractory bodies, containing cyanite, crystalline alumina and silica, the said materials being in quantities sufficient to approximately counteract shrinkage of the other ingredients at various stages of firing in manufacture and when in use.

In testimony whereof we, the said JAMES M. LAMBIE and DONALD W. ROSS, have hereunto set our hands.

JAMES M. LAMBIE.
DONALD W. ROSS.